United States Patent [19]

Alfenaar et al.

[11] 4,024,033

[45] May 17, 1977

[54] PROCESS FOR PREPARING CYANOGEN HALIDES

[75] Inventors: Marinus Alfenaar, Schinnen; Désiré J. N. Jadoul, Valkenburg (L), both of Netherlands

[73] Assignee: Stamicarbon B.V., Geleen, Netherlands

[22] Filed: May 21, 1974

[21] Appl. No.: 471,953

[30] Foreign Application Priority Data

May 21, 1973 Netherlands ............... 7307035

[52] U.S. Cl. .............. 204/59 R; 423/371; 423/379; 423/383

[51] Int. Cl.² .............. C25B 1/24; C25B 1/26; C01C 3/00

[58] Field of Search ......... 204/59 R, 101; 423/371, 423/379, 383

[56] References Cited

UNITED STATES PATENTS

| 631,468 | 8/1899 | Kellner | 204/99 |
|---|---|---|---|
| 984,703 | 2/1911 | Ramage | 204/257 X |
| 3,105,023 | 9/1963 | Foreman | 204/101 |
| 3,300,398 | 1/1967 | Sprague | 204/101 |
| 3,423,175 | 1/1969 | Horovitz et al. | 423/383 |
| 3,592,616 | 7/1971 | Durrell et al. | 423/371 |

FOREIGN PATENTS OR APPLICATIONS

| 301,911 | 4/1971 | U.S.S.R. | 423/383 |

OTHER PUBLICATIONS

Hack's Chemical Dictionary by Grant, 3rd Ed., p. 246, Pub. by Blakiston, Philadelphia, 1944.

*Primary Examiner*—F.C. Edmundson
*Attorney, Agent, or Firm*—Cushman, Darby & Cushman

[57] ABSTRACT

Cyanogen halides, particularly cyanogen bromide and cyanogen chloride, are prepared in an electrolysis cell with cathode and anode chambers separated by a semipermeable diaphragm, by reacting halide ions with hydrogen cyanide or a salt thereof in the anode chamber by means of a direct current, the pH value of the reactant in the anode chamber being lower than 4.

7 Claims, No Drawings

PROCESS FOR PREPARING CYANOGEN HALIDES

This invention relates to a process for preparing cyanogen halides, particularly cyanogen bromide and cyanogen chloride of the type in which halide ions react in the anode chamber of an electrolysis cell with cathode and anode chambers separated by a semipermeable diaphragm with hydrogen cyanide or a salt thereof, using a direct current.

A process of this kind has been proposed for the preparation of cyanogen bromide or cyanogen chloride from ammonium bromide or ammonium chloride and hydrogen cyanide, but has the disadvantage of a low current efficiency, e.g. 65%, particularly for the preparation of cyanogen chloride.

It has now been found that the pH-value in the anode chamber has a great influence on the current efficiency obtainable, particularly in the preparation of cyanogen chloride.

The invention provides a process for preparing a cyanogen halide in an electrolysis cell with cathode and anode chambers separated by a semi-permeable diaphragm, comprising reacting halide ions in the anode chamber with hydrogen cyanide or a salt thereof by means of a direct current, wherein the pH value of the reactant in the anode chamber is lower than 4.

Preferred pH values used according to the invention are between 0.5 and 2.

The required pH value may be obtained by supplying acid to the anode chamber. Preferably the anion of the acid is identical to that of the halide and/or cyanide used as starting material.

The required pH value in the anode chamber may also be achieved without supplying acid to the said chamber, by a suitable choice of diaphragm material. In the anode chamber acid is liberated according to the anodic reaction:

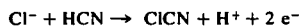

$$Cl^- + HCN \rightarrow ClCN + H^+ + 2\,e^-$$

Diffusion of the hydroxyl ions formed in the cathode chamber to the anode chamber results in neutralization of the acid formed in the anode chamber and may be opposed according to a preferred feature of the invention by the use of a selective cation-permeable diaphragm. Normally the protons formed will then however diffuse rapidly through the diaphragm to the cathode chamber, where protons are used up through discharge. Preferably therefore a diaphragm is used having a relatively low permeability to protons as a result of which it is possible to set such a concentration gradient of protons over the diaphragm that the pH in the anode chamber assumes the desired value below 4. However it is readily to be understood that the permeability of the diaphragm should not be so small as to provide the electro-chemical cell with a prohibitively high internal resistance.

Diaphragms satisfying there criteria are commercially available, and a suitable choice may readily be made according to published specification of such diaphragms, taking into account the reaction temperature and the electrolyte concentration used.

The anode chamber is preferably separated from the other chamber(s) in the electro-chemical cell by a suitable selective cation-permeable diaphragm. The cathode chamber may be directly connected to this, although there may also be an intermediate chamber separated from the cathode chamber by a selective anion-permeable diaphragm. As opposed ions of the halide ions used for starting material, the electrochemical cell will together with hydrogen ions preferably contain alkali-metal ions, alkaline-earth metal ions, or ammonium ions possibly substituted with one or more alkyl-, cycloalkyl-, aryl-, alkaryl- and/or aralkyl-groups with not more than 10 carbon atoms each. With the use of non-substituted ammonium chloride as starting material, formation of the highly explosive $NCl_3$ in the anode chamber is possible, but this danger may substantially be reduced by appropriate measures. However the use of an alkyl-substituted ammonium halide, an (earth)-alkali-metal halide or a hydrogen halide as starting material is preferred as obviating this possibility.

Preferably the amount of acid supplid to the electrochemical cell should not be larger than is necessary for setting and maintaining the desired low pH value in the anode chamber. A maximum amount of hydroxide or ammonia can then be recovered as by-product from the cathode chamber. For this reason, the use of an alkali-metal halide, particularly the potassium and sodium salts thereof, is preferable.

Alkaline-earth metal hydroxides are not desirable as a by-product as because of their often poor solubility, they may give rise to clogging in the cathode chamber. A second advantage of limiting the quantity of acid supplied to the electro-chemical cell is the reduction of the heat production in the cell which can be achieved thereby. Discharge from the cell of the heat produced is difficult, so that reduction of the heat production involves significant advantages.

Preferably the quantity of acid formed in the anode chamber of the electro-chemical cell for the reasons as hereinbefore set forth should not be larger than is necessary to maintain the desired low pH value. This can be achieved by starting from a salt of hydrocyanic acid or a mixture of hydrocyanic acid and its salt, instead of from pure hydrogen cyanide. Thus according to a preferred procedure of realizing the process according to the invention, an alkali-metal halide and an alkali-metal cyanide are used as starting materials.

The catholyte need not contain any salt and both halide and cyanide may be absent. For use on an industrial scale the catholyte preferably consists of a solution of the metal hydroxide which also forms as a by-product in the manner hereinbefore set forth.

Suitable concentrations of the reactants in the anolyte lie between 1 and 10% by weight of the cyanide based on cyanide ions, and between 3 and 20% by weight of the halide based on halide ions.

The temperature in the electro-chemical cell preferably is between 20° and 75° C. In general the current efficiency will decrease as the temperature rises. The pressure is not critical so that operation may be at the atmospheric pressure, but higher or lower pressures, for instance between 0.5 and 10 atmospheres, may be used.

The current density at the anode is preferably between 300 and 5000 A/m². The terminal voltage depends on the chosen current density, the cell design and the other reaction conditions. Suitable anode materials are for instance, graphite or platinum or other metals e.g. titanium, tantalum and vanadium with a protective, conductive mixed oxide skin. The mixed oxide skin may, for instance, consist of titanium ruthenium oxide, titanium niobium oxide or vanadium ruthenium oxide.

The process according to the invention is particularly suitable for operation as a continuous process. Hydrocyanic acid and/or its salt is/are then supplied continuously to the anode chamber in a quantity of about 0.5 gmole per Faraday unit of electric current passed through. Halide ion in the form of the hydrogen halide or its alkali metal salt or ammonium salt is continuously supplied to the anode chamber. From the product mixture withdrawn from the anode chamber the cyanogen halide is separated off in known manner, preferably by distillation.

If desired, the reaction mixture (anolite) can be led through two or more successive electrolysis cells in series, wherein the current density at the anode preferably decreases in the successive cells. In this way the formation of undesired by-products can be suppressed.

The process according to the invention is particularly suitable for preparation of cyanogen chloride, which hitherto could only be prepared with a small current efficiency. Cyanogen chloride is an important intermediate product, for instance in the preparation of cyanuric chloride and of melamine through the production of cyanamide. Cyanogen bromide may also serve as an intermediate product in the preparation of melamine.

The following Examples of the invention are provided:

EXAMPLE I

Cyanogen chloride was prepared in an electrolysis cell comprising an anode chamber and a cathode chamber separated by a selective cation-permeable diaphragm, commercially available under the designation AMF-C 311 from American Machine & Foundry Company.

The anolite initially consisted of 158 g of ammonium chloride, 16.8 g of hydrogen cyanide and 452 g of water. Platinum gauze was used as the anode. The current density at the anode was 1500 A/m$^2$.

At the start of the process the catholite was formed by a saturated ammonium chloride solution. The cathode consisted of steel wool. The bath voltage was approximately 4 V and the temperature about 20° C.

The pH of the anolite was about 1. Cyanogen chloride was formed at a current efficiency of 91%.

EXAMPLE II

The process of Example I was repeated except that the anolite consisted of 164 g of sodium chloride, 15.5 g of hydrogen cyanide and 468 g of water. The catholite was formed by a saturated sodium chloride solution.

The pH of the anolite was about 1. Cyanogen chloride was formed at a current efficiency of 98%.

EXAMPLE III

The process of Example I was repeated, except that the anolite consisted of 149 g of sodium chloride, 28.1 g of sodium cyanide and 468 g of water, to which an amount of concentrated hydrochloric acid was added to obtain a pH value of 0.5. The catholite was formed by a saturated sodium chloride solution.

Cyanogen chloride was formed at a current efficiency of 90%.

COMPARATIVE TEST

The process to Example III was repeated except that no acid was added. The pH value of the anolite was between 9 and 11. Cyanogen chloride formed, but the current efficiency was only 7.3%.

We claim:

1. A process for preparing cyanogen chloride or cyanogen bromide in an electrolysis cell with cathode and anode chambers separated by a semi-permeable diaphragm, comprising reacting chloride or bromide ions in the anode chamber with hydrogen cyanide or a salt thereof by means of a direct current, wherein the current density of the anode is between 300 and 5000 A/m$^2$ wherein the pH value of the reaction medium in the anode chamber is lower than 4.

2. A process according to claim 1, wherein the pH value in the anode chamber is between 0.5 and 2.

3. A process according to claim 1, wherein the pH value in the anode chamber is controlled by the use of a diaphragm which is a selective cation-permeable diaphragm having a small permeability to hydrogen ions.

4. A process according to claim 1, wherein the reaction mixture is led through two or more successive electrolysis cells in series and wherein the current density at the anode decreases in the successive cells.

5. A process according to claim 1, wherein an alkali metal chloride or bromide and an alkali metal cyanide are used as starting material.

6. A process according to claim 1, wherein cyanogen chloride is prepared.

7. The process of claim 1, wherein said salt is an alkali metal cyanide.

* * * * *